United States Patent
Taylor et al.

[11] 3,869,132
[45] Mar. 4, 1975

[54] FIRE RESISTANT SEALING RING COMBINATION

[75] Inventors: Dudley D. Taylor, Beltsville;
Bernard J. Sadoff, Jr., Rockville;
Horace P. Halling, Laurel, all of Md.

[73] Assignee: Pressure Science, Inc., Beltsville, Md.

[22] Filed: July 18, 1973

[21] Appl. No.: 380,200

[52] U.S. Cl.................. 277/26, 277/180, 277/205
[51] Int. Cl.............................................. F16j 9/00
[58] Field of Search ............. 277/26, 180, 205, 206

[56] References Cited
UNITED STATES PATENTS

| | | | |
|---|---|---|---|
| 3,167,322 | 1/1965 | Alchroth | 277/180 |
| 3,192,690 | 7/1965 | Taylor | 277/205 X |
| 3,215,442 | 11/1965 | Papenguth | 277/180 |
| 3,531,133 | 9/1970 | Sheesley et al. | 277/180 |
| 3,630,483 | 12/1971 | Canalizo | 277/205 |

Primary Examiner—Samuel B. Rothberg
Attorney, Agent, or Firm—Roylance, Abrams, Berdo & Kaul

[57] ABSTRACT

There is disclosed a fail-safe fire resistant sealing ring combination which provides a tight seal in a joint, such as in a fuel line. The primary sealing means for providing a tight seal under normal conditions is achieved by the use of an elastomeric sealing ring. A backup metallic sealing ring having radial leg portions which at least partially surround the elastomeric sealing ring is also provided. Another metallic confining means, e.g., a metallic ring which may be separate from or integral with one of the flanges forming the cavity in which the sealing rings are located, is situated contiguous to the sealing portion of the elastomeric sealing ring on the side opposite of the metallic sealing ring, i.e., in contact with the fluid which is being confined. Under conditions of extremely high temperatures such as generated by fire, the elastomeric seal will initially expand providing a driving force for the metallic sealing ring causing it to be driven with greater force into zero leakage sealing engagement with the sides of the line which is being sealed. When the elastomeric seal subsequently disintegrates due to the high temperature, the metallic seal provides a no-leak fuel seal. In the event of a fire, when fuel is flowing through the pipe, the inner metallic confining means prevents the disintegrating elastomeric compound from entering the fuel stream. It also prevents erosion of the elastomeric seal by the fuel flow during normal operation of the system.

9 Claims, 7 Drawing Figures

FIRE RESISTANT SEALING RING COMBINATION

This invention relates to the use of a novel sealing ring combination for confining fluids at high temperatures and pressures and which operates as a fail-safe seal system in the event of fire.

There are many applications, such as in the fuel and hydraulic piping systems in aircraft, missiles and the like, wherein it is particularly desirable or essential to make pipe connections or fittings with lightweight components. Static seals and/or gaskets which are used to contain flammable fluids, such as fuel on aircraft engines, must be functionally operable when subjected to 2000° F. flame temperatures for 5 minutes, these being representative of extreme conditions resulting from the outbreak of a fire. Under normal operating conditions, such seals must provide very tight seals, i.e., zero leakage, at relatively moderate temperatures and pressures. Metallic seals that can satisfy these requirements require high compressive loads at installation which makes the use of lightweight connections or fittings impossible. Seals made from an elastomeric material such as rubber satisfy this requirement and are also generally more effective than metallic seals under moderate conditions in providing zero leakage when used in fittings or connections with imperfections in the surface finish. However, elastomeric seals are totally ineffective under fire conditions since they decompose under such conditions. As a result, when a fire does occur in an environment wherein elastomeric seals are used in fuel lines, the seal will fail and flammable liquid will spray out of the line, thus feeding the fire.

U.S. Pat. No. 3,375,016 to Jellinek et al. discloses a two stage seal arrangement used with concentric members. An elastomer O-ring is the primary seal against flow of a hot fluid. There is also provided a back-up metallic O-ring which is not initially in sealing engagement with the concentric members. The metallic O-ring is constructed of a material having a coefficient of expansion greater than the material of which either of the concentric members is manufactured. As hot fluids flow through the inner member, they cause the metallic O-ring to gradually expand until it is in tight sealing engagement with both members. Therefore, if the elastomeric ring is destroyed by the hot fluids, the expanded metallic ring remains as a seal between the concentric members. The metallic O-ring may be filled with an inert gas or a solid substance which sublimes at high temperatures to further increase the expansion of the ring under high temperatures and thus enhance the sealing properties thereof.

It is an object of this invention to provide a combination of sealing rings which will provide zero leakage under moderate conditions and which will still maintain a tight seal under fire conditions.

It is another object of this invention to provide a metallic sealing ring and an elastomeric sealing ring in a combination such that the fluid in a line which is being sealed will have a minimum contact with the elastomeric material and such that under fire conditions the metallic seal will be caused to be pressed into a zero leakage sealing engagement with the line which is being sealed before the elastomeric seal disintegrates under conditions of fire.

These and other objects are attained by the practice of this invention which, briefly, comprises providing in a cavity defined by a pair of relatively movable flange members in which high temperatures and pressures may be encountered a primary elastomeric sealing ring which provides a tight seal under normal operating conditions. There is also situated in the cavity at a point remote from contact with the confined fluid which is under pressure a secondary metallic sealing ring. This metallic sealing ring has curved leg portions which at least partially surround a portion of the elastomeric sealing ring. Another metallic confining means, e.g., a metallic ring which may be separate from or integral with one of the flanges forming the cavity in which the sealing rings are located, is situated in the cavity contiguous to the elastomeric ring on the side opposite that of the metallic sealing ring, i.e., at a point in contact with the fluid which is being confined under pressure. Under conditions of extremely high temperatures such as generated by a fire, the elastomeric seal will initially expand. The metallic ring which is contiguous to the elastomeric ring in contact with the confined fluid prevents the elastomeric ring from expanding in the direction of the confined fluid. Thus, all of the expansion of the elastomeric material is in the direction of the metallic sealing ring and this expansion acts as a driving force to expand the leg portions of the metallic sealing ring into a sealing engagement with the sides of the cavity. As a result, before the elastomeric sealing ring disintegrates due to the high temperature, its initial expansion causes it to energize the metallic sealing ring with sufficient force to yield a no-leak high temperature fuel seal.

The invention will be more fully described by reference to the drawings herein:

Figure 3:
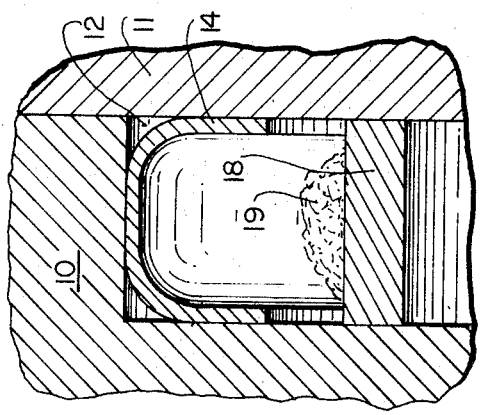
FIG. 3 shows the metallic sealing ring of FIG. 1 in sealing contact with the sides of the cavity after the elastomeric sealing ring has disintegrated.
Figure 2:
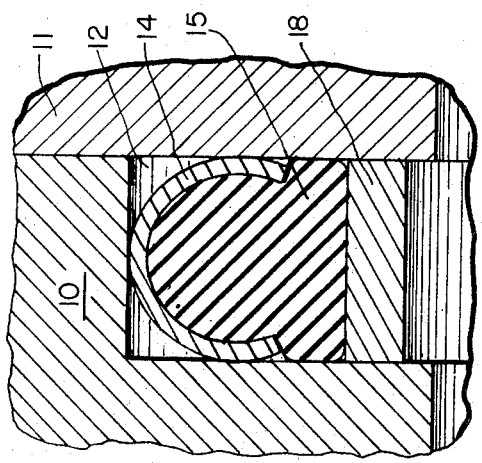
FIG. 2 illustrates the initial thermal expansion of the elastomeric sealing ring of FIG. 1.
Figure 1:
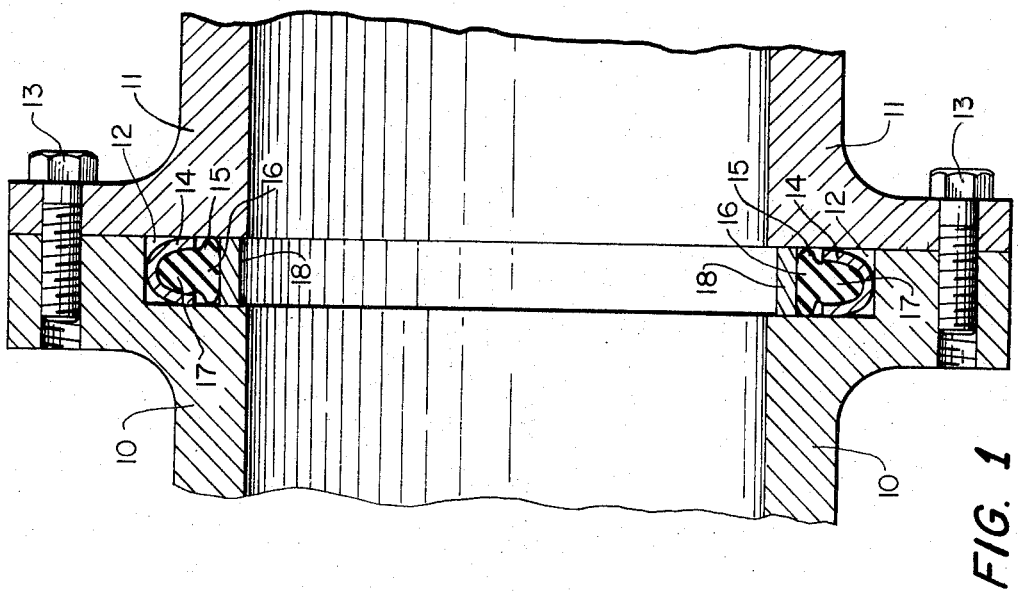
FIG. 1 is a cross-sectional view of a cavity defined by a pair of relatively movable flange members, which cavity contains an elastomeric sealing ring, a metallic sealing ring and a metallic ring adjacent to the sealing portion of the elastomeric ring.

Referring to the drawings in detail, in FIGS. 1, 2, and 3 there is shown a fluid line coupling which may be used in the combination of the present invention, i.e., for coupling flanged members, such as tube sections in a fluid fuel line. The coupling assembly includes mating flanged members 10 and 11. The flanges are secured as by welding to the tube sections. The face of the flange 10 contains a recess which, in combination with the face of the flange 11, forms an annular cavity 12. The flanges 10 and 11 are coupled together by means of a bolt 13 which engages threads in the flange 10 (not shown). Alternately, a V-flange coupling as described in U.S. Pat. No. 3,575,432 may be used. A metallic C-ring 14, i.e., a ring which is approximately C-shaped in radial cross section, is positioned in the cavity 12 so that the arms of the C-ring are adjacent the sides of the cavity 12.

The metallic sealing ring 14 may be constructed of any thin metal, e.g., stainless steel, and may be coated with various materials such as silver, gold, lead, indium, etc.

An elastomeric sealing ring 15 is also positioned in the cavity 12. This ring, which may be constructed of rubber or other elastomeric material, comprises an inner or sealing portion 16 having a thickness which is initially slightly larger than the width of the cavity 12 so that it will be compressed in the cavity 12 to provide a substantially zero leakage seal, and a narrower portion 17 which has a thickness less than that of the sealing portion 16. The narrower portion 17 is situated between the two legs of the metallic sealing ring 14. A separate metallic ring 18 is held adjacent to the inside of the diameter of the elastomeric ring 15 as by compression or bonding. Certain fluids have a tendency to attack elastomers and cause the elastomeric material to be eroded away. The metallic ring 18 acts to prevent this action by providing a metallic barrier between the fluid in the line and the elastomeric ring 15. Under normal operating conditions, the primary seal is provided by the elastomeric ring 15, i.e., this ring provides substantially zero leakage.

A backup seal is provided by the metallic C-seal 14 at its faces through metal-to-metal contact with the sides of the cavity 12. While roughness or scratches on the sides of the cavity 12 may cause the metallic seal to be less than completely leakproof, this is of no consequence under normal conditions since the primary seal provides zero leakage and the secondary metallic seal is not pressurized. However, when the joint is subjected to fire conditions, the elastomeric seal 15 initially undergoes expansion, e.g., up to 5 percent by volume. The presence of the metallic ring 18 confines the rubber and prevents expansion in the direction of the confined fluid, thereby causing the elastomer to expand in the direction of the metallic C-ring. This results in a significant driving force, energizing the C-ring with a very high pressure, e.g., from 20,000 to 40,000 psi, even though the pressure of the fluid in the line may only be 200 to 300 psi. This pressure pushes the legs of the C-ring with sufficient force to seat the metal seal and coin the metal surface on the sides of the cavity 12 thus providing a no-leak metallic seal. Flammable liquid is thereby prevented from spraying out between the flanges and feeding the fire. In the event of a fire, when fuel is flowing through the pipe, the inner metallic ring also prevents the disintegrating elastomeric compound from entering the fuel stream. It also prevents erosion of the elastomeric seal by the fuel flow during normal operation of the system.

FIG. 2 shows the elastomeric seal 15 in an expanded condition and FIG. 3 shows the seal after it has been combusted, the noncombustible material being shown at 19. The legs of the ring 14 are in sealing contact with the sides of the cavity 12.

Figure 4:
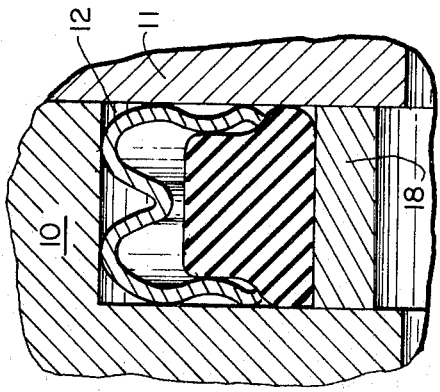
FIG. 4 shows the use of a different type of metallic sealing ring than shown in FIGS. 1–3.

In FIG. 4, the metallic sealing ring 20 comprises an integral piece of resilient metal approximately E-shaped in radial cross-section. The outer arms of the E have a sinuous configuration and terminate in convex portions. The central arm of the E is a loop having its two sides out of contact with each other. Such rings are described in detail in U.S. Pat. Nos. 3,192,690 and 3,575,432, the disclosures of which are incorporated herein by reference. Metallic E-seals, especially those having multiple convolutions on each outer leg thereof, have the advantage of being more resilient than C-seals, thereby lowering the amount of squeeze force which needs to be exerted through tightening of the bolts 13 in order to achieve a satisfactory seal. This permits the use of lighter weight flanges. Moreover, a convoluted E-seal can better conform to flange warpage resulting from a fire.

Figure 5:
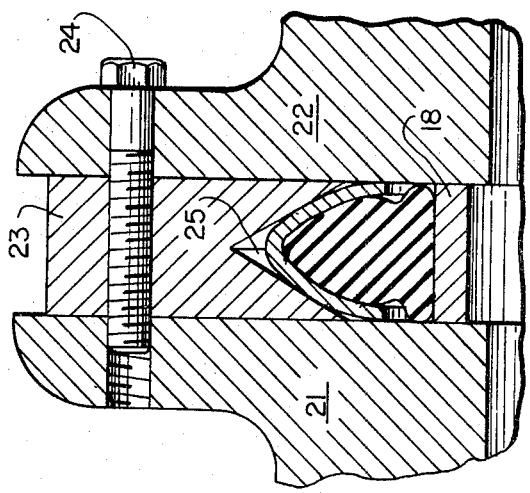
FIG. 5 illustrates a different means for forming the cavity.

FIG. 5 shows two flange members 21 and 22, each having a flat surface. A plate 23 having a V-shaped recess on the inner surface thereof is positioned between the flanges 21 and 22 to act as a retaining means for the sealing rings. The combination of flanges 21 and 22 and plate 23 are secured together by means of a threaded bolt 24 to form a cavity 25. The C-seal 26, the elastomeric seal 27 and the metal ring 18 are positioned in the cavity 25 formed by the opposing faces of flanges 21 and 22 and the V-shaped inner diameter of the plate 23. Preferably, the C-seal is slightly elliptical and its average outside diameter is less than the inside diameter of the plate. When the C-seal 26 is compressed by tightening the bolts 24, it expands in diameter into the V-groove of the plate 23. Less pressure is required to compress the seal 26 than if the V-groove were not present.

Figure 7:
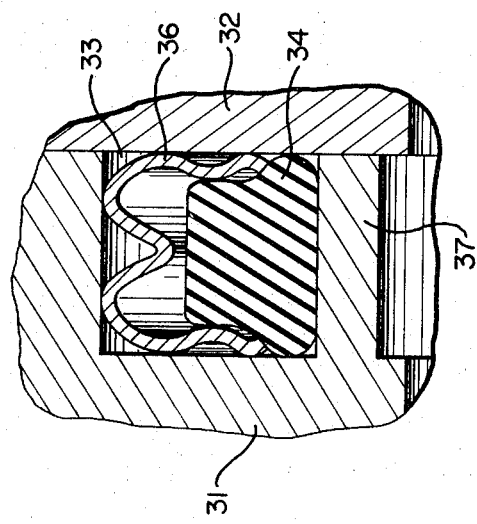
FIGS. 6 and 7 are similar to FIGS. 1 and 4, respectively, except that the metallic ring which separates the elastomeric ring from the confined fluid is an integral part of one of the flanges rather than being separate therefrom.
Figure 6:
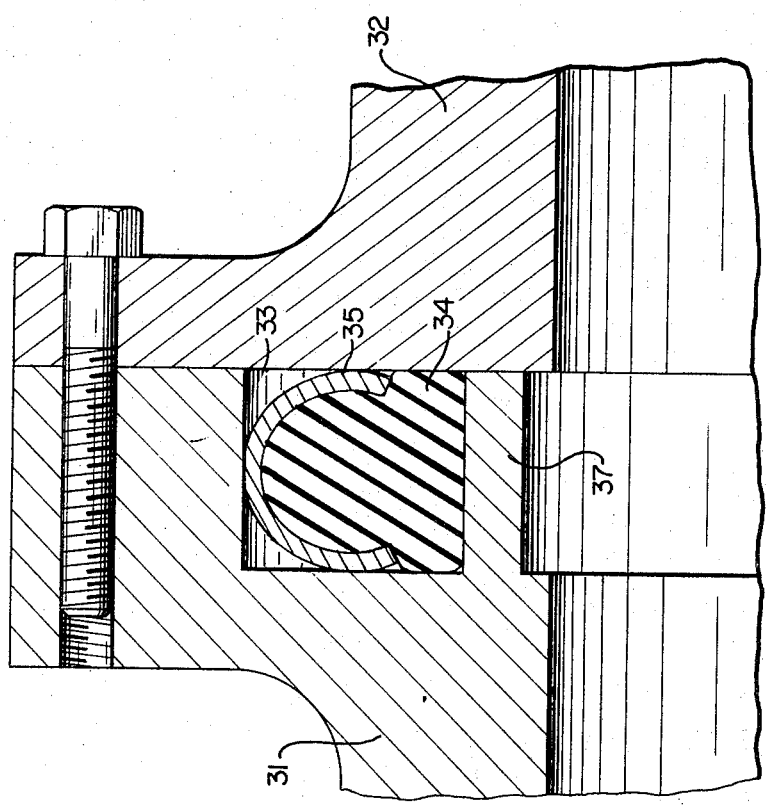

FIGS. 6 and 7 show flange members 31 and 32, which, in combination with each other, form an annular cavity 33. An elastomeric sealing ring 34 is located in the cavity along with a metallic C-ring 35 (FIG. 6) or a metallic E-ring 36 (FIG. 7). A projecting ring 37 whch is integral with the flange member 31 closes off the bottom of the cavity 33 contiguous to the elastomeric ring and thus serves the same function as the metallic ring 18 previously described with respect to FIGS. 1–5.

We claim:

1. The combination of a pair of relatively movable flange members which define between them a cavity in which high pressures and temperatures may be encountered, a primary elastomeric sealing ring positioned in said cavity which provides a tight seal under normal operating conditions, a secondary deflectable metallic sealing ring situated in said cavity at a point remote from contact with the confined fluid which is under pressure, said metallic sealing ring having curved leg portions which at least partially surround a portion of said elastomeric sealing ring, and a metallic ring situated in said cavity contiguous to said elastomeric ring on the side opposite of said metallic sealing ring defining means for confining the fluid and the elastomeric ring, whereby said last mentioned metallic ring prevents substantial expansion of said elastomeric ring in the direction of the fluid being confined so that when said elastomeric sealing ring expands under conditions of high temperature, it expands in the direction of said metallic sealing ring and forces said metallic sealing ring into a tighter sealing engagement with said cavity.

2. The combination as defined in claim 1 wherein said last mentioned metal ring prevents the fluid which is being confined from coming into substantial contact with said elastomeric sealing ring.

3. The combination of claim 1 wherein said elastomeric sealing ring comprises a sealing portion having a thickness which before being compressed is slightly greater than the width of said cavity in which it is situated and a narrower portion positioned between the leg portions of said metallic sealing ring.

4. The combination as defined in claim 3 wherein said last mentioned metallic ring is bonded to the wider portion of said elastomeric sealing ring.

5. The combination as defined in claim 3 wherein said metallic sealing ring has a C-shaped radial cross-section.

6. The combination as defined in claim 3 wherein said metallic sealing ring has an approximately E-shaped radial cross-section, the outer arms of the E having a sinuous configuration and terminating in convex portions.

7. The combination as defined in claim 3 wherein said cavity is formed by the opposing flat faces of two flanges, said flanges being separated by a plate having a V-shaped recess on the inner surface thereof, into which said metallic sealing ring is compressed.

8. The combination as defined in claim 3 wherein said last mentioned metallic ring is an integral part of one of said flanges.

9. The combination as defined in claim 3 wherein said last mentioned metallic ring is separate from both of said flanges.

* * * * *